United States Patent
Bae

(10) Patent No.: US 10,738,412 B2
(45) Date of Patent: Aug. 11, 2020

(54) DUAL TYPE DRYING MACHINE

(71) Applicant: LG ELECTRONICS INC., Seoul (KR)

(72) Inventor: Sang Hun Bae, Seoul (KR)

(73) Assignee: LG Electronics Inc., Seoul (KR)

( * ) Notice: Subject to any disclaimer, the term of this patent is extended or adjusted under 35 U.S.C. 154(b) by 311 days.

(21) Appl. No.: 15/608,080

(22) Filed: May 30, 2017

(65) Prior Publication Data

US 2018/0187367 A1    Jul. 5, 2018

(30) Foreign Application Priority Data

Dec. 29, 2016  (KR) .......................... 10-2016-0183099
Dec. 29, 2016  (KR) .......................... 10-2016-0183101

(51) Int. Cl.
*D06F 58/30*  (2020.01)
*D06F 58/20*  (2006.01)
(Continued)

(52) U.S. Cl.
CPC ......... *D06F 58/30* (2020.02); *B01D 53/0462* (2013.01); *B01D 53/261* (2013.01);
(Continued)

(58) Field of Classification Search
CPC .. D06F 58/28; D06F 58/20; D06F 2058/2841; D06F 58/263; D06F 58/10;
(Continued)

(56) References Cited

U.S. PATENT DOCUMENTS 2,774,506 A * 12/1956 Miller .................... D06F 37/28
160/188
3,402,477 A *  9/1968 Hubbard ............... D06F 39/125
34/543
(Continued)

FOREIGN PATENT DOCUMENTS

CN    1966808    5/2007
CN    1966833    5/2007
(Continued)

OTHER PUBLICATIONS

International Search Report in International Application No. PT/KR2017/009342, dated Dec. 18, 2017, 15 pages (with partial English translation).
(Continued)

*Primary Examiner* — Jessica Yuen
(74) *Attorney, Agent, or Firm* — Fish & Richardson P.C.

(57) ABSTRACT

A dual type drying machine includes a main drying unit, a main unit door configured to open and close a front side of the main drying unit, an auxiliary drying unit positioned vertically above the main drying unit and defining a laundry accommodation space, an auxiliary unit door configured to open and close a top surface of the laundry accommodation space, a cabinet that accommodates the main drying unit and the auxiliary drying unit, the cabinet defining an exterior of the drying machine, and an operation panel disposed at a front side of the auxiliary drying unit. When the auxiliary unit door is closed, top surfaces of the cabinet and the auxiliary unit door define a top exterior surface of the drying machine.

20 Claims, 16 Drawing Sheets

(51) Int. Cl.
*B01D 53/04* (2006.01)
*B01D 53/26* (2006.01)
*D06F 58/10* (2006.01)
*D06F 29/00* (2006.01)
*D06F 39/12* (2006.01)
*D06F 58/02* (2006.01)
*D06F 58/38* (2020.01)
*D06F 103/12* (2020.01)
*D06F 58/26* (2006.01)
*D06F 60/00* (2009.01)

(52) U.S. Cl.
CPC .............. *D06F 58/20* (2013.01); *B01D 53/04* (2013.01); *B01D 53/26* (2013.01); *D06F 29/005* (2013.01); *D06F 39/12* (2013.01); *D06F 58/02* (2013.01); *D06F 58/10* (2013.01); *D06F 58/263* (2013.01); *D06F 58/38* (2020.02); *D06F 60/00* (2013.01); *D06F 2103/12* (2020.02)

(58) Field of Classification Search
CPC .......... D06F 58/02; D06F 60/00; D06F 39/12; D06F 29/005; B01D 53/0462; B01D 53/261; B01D 53/04; B01D 53/26
See application file for complete search history.

(56) References Cited

U.S. PATENT DOCUMENTS

| | | | | |
|---|---|---|---|---|
| 3,555,701 A * | 1/1971 | Hubbard | ................. | D06F 58/02 34/602 |
| 6,973,740 B2 * | 12/2005 | Meyer | .................... | D06F 58/10 34/202 |
| 7,913,419 B2 * | 3/2011 | Tomasi | ................... | D06F 29/00 211/85.3 |
| 8,047,026 B2 * | 11/2011 | Won | ........................ | D06F 39/14 68/196 |
| 8,413,471 B2 * | 4/2013 | Han | ....................... | D06F 39/125 68/20 |
| 2004/0194339 A1 | 10/2004 | Johnson | | |
| 2006/0090524 A1* | 5/2006 | Jeon | ........................ | D06F 25/00 68/135 |
| 2014/0238088 A1 | 8/2014 | Bae | | |

FOREIGN PATENT DOCUMENTS

| | | | | |
|---|---|---|---|---|
| CN | 101153456 | | 4/2008 | |
| CN | 101570929 | | 11/2009 | |
| CN | 101657580 | | 2/2010 | |
| CN | 102016159 | | 4/2011 | |
| CN | 102677418 | | 9/2012 | |
| EP | 1854916 | | 11/2007 | |
| GB | 1252509 A | * | 11/1971 | ............. G06F 58/10 |
| JP | 54108060 A | * | 8/1979 | ........... D06F 29/005 |
| JP | 2015196027 | | 11/2015 | |
| KR | 10-2006-0060212 | | 6/2006 | |
| KR | 100857799 | | 9/2008 | |
| KR | 20120107261 A | | 10/2012 | |
| KR | 10-2015-0103372 | | 9/2015 | |
| WO | WO2008123698 A | | 10/2008 | |

OTHER PUBLICATIONS

Extended European Search Report in European Application No. 17201892.1, dated Apr. 20, 2018, 8 pages.

* cited by examiner

DUAL TYPE DRYING MACHINE

CROSS-REFERENCE TO RELATED APPLICATION

This application claims priority to and the benefit of Korean Patent Application No. 2016-0183099 filed on Dec. 29, 2016, and Korean Patent Application No. 2016-0183101 filed on Dec. 29, 2016, the disclosures of which are incorporated herein by reference in their entirety.

FIELD

The present disclosure relates to a drying machine, and more particularly, to a dual type drying machine including a front loading main drying unit and a top loading auxiliary drying unit.

BACKGROUND

A drying machine is an apparatus that can dry clothes and remove moisture from the clothes by supplying dried hot wind to the clothes.

In general, the drying machine can include a hear source such as an electric heater, a gas heater, and a heat pump. Thus, the drying machine can be classified according to the type of a heat source.

In addition, the drying machine can be also classified into various types according to the shape of a laundry accommodation unit. A drying machine including a drum-shaped laundry accommodation unit that rotates around a horizontal shaft, is referred to as a horizontal shaft drum type drying machine, and a drying machine including a drum-shaped laundry accommodation unit that rotates around a vertical shaft, is referred to as a vertical shaft drum type drying machine. Also, a drying machine including a laundry accommodation unit fixed to an inside of a cabinet is referred to as a cabinet drying machine or refresher.

FIGS. 1-4 describe a conventional heater drying machine and a conventional heat pump drying machine.

FIG. 1 is a conceptual view schematically illustrating an example of a conventional heater drying machine.

As illustrated in FIG. 1, the example heater drying machine includes a drum 10 and an air circulation unit 20 that can circulate air through the drum 10. The air discharged from the drum 10 through the air circulation unit 20 flows into the drum 10. Thus, the air circulates through the air circulation unit 20. A drying fan 50 is provided for circulation of air. The drying fan 50 is provided inside the air circulation unit 20 for generating the air flow.

The air circulation unit 20 may include an additional flow path (duct), and a part of the flow path may be formed at a base 70 (see FIG. 2) of the heater drying machine. Furthermore, the drum 10 may also be a part of the air circulation unit 20.

In order to dry laundry in the drum 10, the air is heated by a heater 60, for example, an electric heater. The heated air flows into the drum 10, and moisture of the air can be removed from the laundry.

The air of which temperature and humidity increase by removing moisture from clothes, may be discharged from the drum 10 and flow into a condenser 40. In some cases, a filter 30 for removing foreign substances such as lint in the air, may be provided between the drum 10 and the condenser 40. The moisture of the high-temperature high-humidity air may be condensed by the condenser 40, and the high-temperature high-humidity air may change into dried air.

The condenser 40 enables the high-temperature high-humidity air to be heat-exchanged with external low-temperature air. In this case, the moisture in the high-temperature high-humidity air is condensed and removed.

A cooling fan 45 may be provided with the condenser 40 so that the external low-temperature air can flow in the drum 10 and can be discharged from the condenser 40 via the cooling fan 45. The cooling fan 45 may be positioned in a cooling flow path 46.

The cooling flow path 46 is provided so that the external air is supplied to the condenser 40 and then is discharged to the outside of the heater drying machine.

The low-temperature dried air discharged from the condenser 40 may be heated by the heater 60 and changed into high-temperature dried air. The high-temperature dried air flows into the drum 10.

Thus, the air circulates via the drum 10, the condenser 40, the drying fan 50, and the heater 60, and drying may be performed through heating and condensation of the circulating air.

The drying machine illustrated in FIG. 1 may also be a blower type drying machine, because it blows the air into the drum 10 from the rear of the drum 10, and the right side of the drum 10 corresponds to the front side of the drying machine, and the left side of the drum 10 corresponds to the rear side of the drying machine. Thus, in this case, the air for drying flows into the rear of the drum 10 and then is discharged to the front of the drum 10.

FIG. 2 is a plan view of an example arrangement of main components and a base 70 of the conventional drying machine illustrated in FIG. 1.

The drum 10 and the heater 60, which are not directly mounted on the base 70, are omitted from FIG. 2. An upper portion of the base 70 illustrated in FIG. 2 corresponds to the rear side of the drying machine, and a lower portion thereof corresponds to the front side of the drying machine.

The condenser 40 is provided at the left side of the base 70, and the cooling fan 45, a motor 55, and the drying fan 50 are provided at the right side of the base 70. The motor 55 is provided to drive the drying fan 50.

In some cases, the drying fan 50 may be provided in front of the drying machine and below the drum 10. The drying fan 50 may also be disposed between the filter 30 and the condenser 40, unlike in FIG. 1.

Referring to FIG. 2, the drying fan 50 may be a suction type drying machine, because it can suction the air in the drum 10 from the front of the drum 10.

According to the relationship between the drying fan 50 and the drum 10 or the heater 60, the drying fan 50 may be classified into a suction type drying machine and a blower type drying machine depending on whether the location of the drying fan 50 is a front end or rear end of the drum 10.

An example air flow will be described below with reference to FIGS. 1 and 2.

The air that flows into the drum 10 is discharged through the front of the drum 10, descends and flows into the condenser 40. The air discharged from the condenser 40 ascends and flows into the drum 10 via the rear of the drum 10. Additional ducts may be provided in the air circulation unit 20 for ascending and descending of the air. These ducts are connected to the drum 10 or base 70 to constitute air circulation unit 20.

The external air may flow into the drying machine via the cooling flow path 46 from the rear of the drying machine and be supplied to the condenser 40.

The external air supplied to the condenser 40 is heat-exchanged with the circulating air inside the condenser 40 and then is discharged in a lateral direction of the drying machine. That is, as the cooling fan 45 is driven, the external air flows into the drying machine and then is discharged via the cooling flow path 46. In some cases, the flow direction of the circulating air and the flow direction of the external air in the condenser 40 may be perpendicular to each other.

FIG. 3 is a conceptual view schematically illustrating an example of a conventional heat pump drying machine.

As illustrated in FIG. 3, the heat pump drying machine may include the drum 10, and the air circulation unit 20 that circulates the air via the drum 10. The air discharged from the drum 10 through the air circulation unit 20 flows into the drum 10 again after undergoing condensation and heating. In this case, the air circulates through the air circulation unit 20.

For circulation of the air, the drying fan 50 may be provided. The drying fan 50 may be positioned inside the air circulation unit 20 and generate the flow of the air.

In order to dry the clothes in the drum 10, the air is heated and cooled by a heat pump system 80. The heat pump system 80 may be a one refrigerating cycle system using a refrigerant. In this case, the heat pump system 80 includes a refrigerant pipe 82, an evaporation heat exchanger 81, a compressor 83, a condensation heat exchanger 84, and an expansion unit 85.

In detail, the refrigerant may flow and circulate through the evaporation heat exchanger 81, the compressor 83, the condensation heat exchanger 84, and the expansion unit 85 via the refrigerant pipe 82.

The refrigerant in the evaporation heat exchanger 81 may absorb heat and be evaporated. That is, evaporation heat exchanger 81 cools the circulating air and condenses moisture through heat-exchanging between the refrigerant and the circulating air. Thus, in terms of the circulating air, the evaporation heat exchanger 81 may be considered as a condenser corresponding to the condenser 40 of the heater drying machine.

The refrigerant in the condensation heat exchanger 84 may dissipate heat and be condensed. That is, the condensation heat exchanger 84 heats the circulating air through heat-exchanging between the refrigerant and the circulating air. Thus, in terms of the circulating air, the condensation heat exchanger 84 may be considered as a heater corresponding to the heater 60 of the heater drying machine.

In this case, condensation and heating of the circulating air may be performed through the heat pump system 80. The circulation air flows into the drum 10. In some cases, a filter 30 for removing foreign substances such as lint in the air may be provided between the drum 10 and the evaporation heat exchanger 81.

Referring to FIG. 3, the right side of the drum 10 corresponds to the front side of the drying machine, and the left side of the drum 10 corresponds to the rear side of the drying machine. Likewise, the drying machine illustrated in FIG. 3 may be a blower type drying machine, because the drying fan 50 is placed behind the drum 10 and blows the air into the drum 10. Another example drying machine illustrated in FIG. 4 may be a suction type drying machine, as described above.

FIG. 4 is a plan view of an example arrangement of main components and the base 70 of the conventional drying machine of FIG. 3. The drum 10 that is not directly mounted on the base 70 is omitted from FIG. 4. An upper portion of the base 70 in FIG. 4 corresponds to the rear side of the drying machine, and a lower portion thereof corresponds to the front side of the drying machine.

The evaporation heat exchanger 81 and the condensation heat exchanger 84 are provided at the left side of the base 70, and the expansion unit 85, the compressor 83, the motor 55, and the drying fan 50 are provided at the right side of the base 70.

An example air flow will be described below with reference to FIGS. 3 and 4.

The air inside the drum 10 may be discharged from the drum 10 through the front of the drum 10 due to a suction force of the drying fan 50. While the discharged air descends and passes through the evaporation heat exchanger 81 and the condensation heat exchanger 84, moisture of the air is removed and the air is heated. Subsequently, the heated air ascends and flows into the drum 10 through the rear of the drum 10.

The heat pump drying machine may not have the cooling fan 45 or the cooling flow path 46 of the heater drying machine, because cooling and heating of the circulating air is performed by the heat pump system 80.

Filtering, condensation and heating of the circulating air of the heat pump drying machine may be the same as those of the above-described heater drying machine. However, the method of heating and condensation may be different from each other. The heater 60 and the condenser 40 of the heater drying machine may correspond to the condensation heat exchanger 84 and the evaporation heat exchanger 81 of the heat pump drying machine, respectively. The heater 60 and the condensation heat exchanger 84 are configured to heat the circulating air and thus may be considered as a heater. The condenser 40 and the evaporation heat exchanger 81 are configured to condense the circulating air and thus may be considered as a condenser.

As described above, the air circulation unit 20 of the conventional heater drying machine and heat pump drying machine may perform similar function. Their drying mechanisms and structures may also be similar to each other.

Recently, the supply of a dual type washing machine including two washing units in one washing machine has been increased.

The dual type washing machine may include a large-capacity washing unit and a low-capacity washing unit having a relatively small capacity, which are provided in a single washing machine.

In the dual type washing machine, one washing unit may be used according to the weight or type of laundry, or two washing units may operate simultaneously according to the type of laundry.

The present disclosure relates to a dual type drying machine that may be used as a pair with a dual type washing machine.

SUMMARY

According to one aspect of the subject matter described in this application, a dual type drying machine includes: a main drying unit; a main unit door configured to open and close a front side of the main drying unit; an auxiliary drying unit positioned vertically above the main drying unit and defining a laundry accommodation space; an auxiliary unit door configured to open and close a top surface of the laundry accommodation space; a cabinet that accommodates the main drying unit and the auxiliary drying unit, the cabinet defining an exterior of the drying machine; and an operation panel disposed at a front side of the auxiliary drying unit. When the auxiliary unit door is closed, top surfaces of the cabinet and the auxiliary unit door define a top exterior surface of the drying machine.

Implementations according to this aspect may include one or more of the following features. The dual type drying machine may further include a rack provided inside the auxiliary drying unit and configured to support laundry. The auxiliary drying unit may include a laundry accommodation unit that includes the laundry accommodation space, a blower fan configured to supply air into the laundry accommodation unit, a heater configured to heat the air that is supplied into the laundry accommodation unit, and a temperature sensor configured to measure a temperature of the heated air. The auxiliary drying unit may further include an air intake flow path configured to guide the supplied air into the laundry accommodation unit, and an outlet of the air intake flow path into the laundry accommodation unit may be positioned vertically below the rack. The blower fan may be disposed rearward of the laundry accommodation unit and vertically below the top surface of the cabinet.

In some implementations, the main drying unit and the auxiliary drying unit may be configured to operate independently of each other. The rack may be detachably coupled to the auxiliary drying unit. The rack may be configured to allow heated air in the laundry accommodation space to flow through the rack. For example, the rack may have a punching plate shape, a screen net shape, or a grille net shape. The laundry accommodation unit may include a plurality of props at inner surfaces of the laundry accommodation unit, and the plurality of props are configured to support the rack.

In some implementations, the auxiliary unit door may include a first door rotatably coupled to the laundry accommodation unit about a first hinge axis. The first door may include a transparent or semi-transparent portion through which an inside of the laundry accommodation unit is viewable. The auxiliary unit door may further include a second door rotatably coupled to the first door about a second hinge axis that is positioned forward of the first hinge axis. The the auxiliary unit door may be configured to be opened by rotating the first door about the first hinge axis or rotating the second door about the second hinge axis or both. In some cases, the first and second hinge axes may be parallel to each other, and the auxiliary unit door can be opened by rotating the first door relative to the laundry accommodation unit in a first direction and rotating the second door relative to the first door in a second direction opposite the first direction. A length of the first door in a front-to-rear direction may be greater than a length of the second door in the front-to-rear direction.

In some implementations, the auxiliary unit door may include a sealing unit that is configured, when the auxiliary unit door is closed, to provide a seal between at least a portion of the auxiliary unit door and the laundry accommodation unit. The cabinet may include a pair of lateral side plates each of which includes a lower lateral side plate that covers a lateral side of the main drying unit and an upper lateral side plate that covers a lateral side of the auxiliary drying unit. The cabinet may further include a single front panel that covers front portions of the main drying unit and the auxiliary drying unit. In some cases, the cabinet may further include an intermediate plate positioned between the main drying unit and the auxiliary drying unit, and the intermediate plate may be parallel with a bottom surface of the cabinet and connecting the pair of lateral side plates to each other. A rearmost end of the auxiliary drying unit may protrude rearward relative to a rearmost end of the main drying unit.

In some implementations, the auxiliary drying unit may further include an exhaust flow path configured to guide air from an inside of the laundry accommodation unit to an exhaust outlet, and the exhaust outlet may be configured to discharge air to an outside of the auxiliary drying unit. The exhaust flow path may have an inlet that is disposed at an inner surface of the auxiliary drying unit and that is spaced apart vertically or laterally from the outlet of the air intake flow path. In some cases, the auxiliary drying unit may define communication holes at a bottom surface of the laundry accommodation space, and the communication holes may be configured to supply the heated air to the laundry accommodation space.

DETAILED DESCRIPTION

Figure 1:
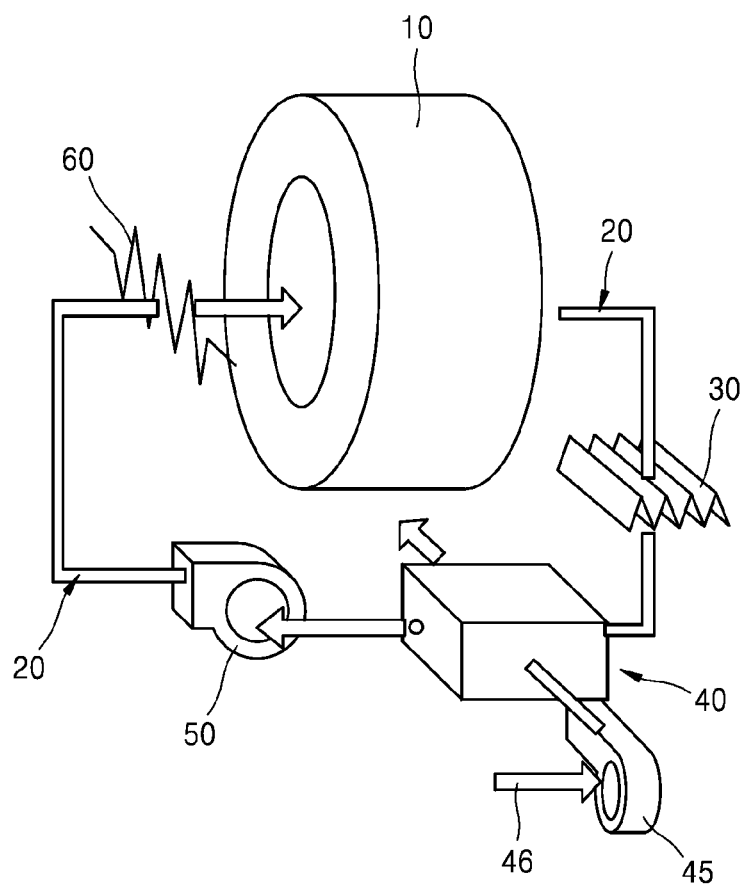
FIG. 1 is a conceptual view illustrating an air circulation unit of an example heater drying machine.
Figure 2:
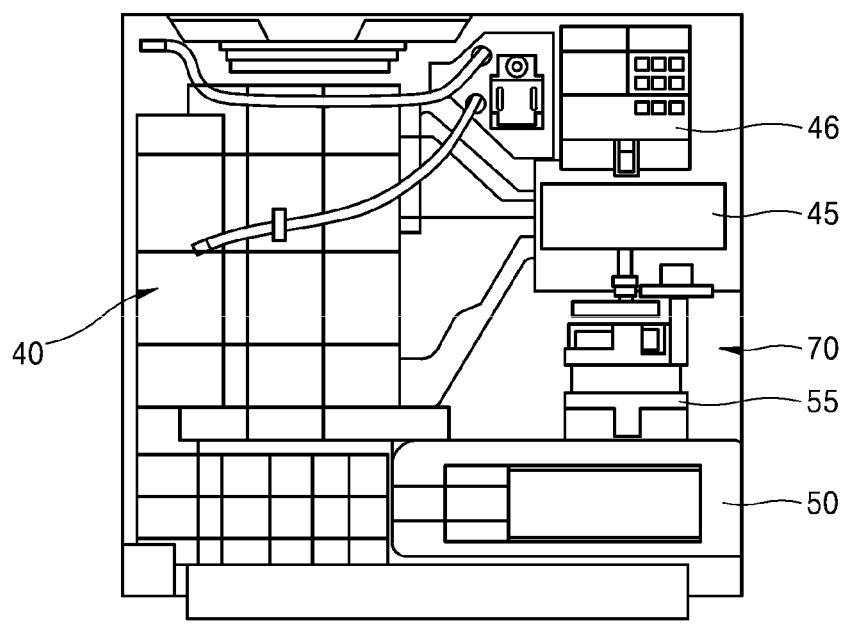
FIG. 2 is a plan view illustrating example base and peripheral components of the base of the heater drying machine of FIG. 1
Figure 3:
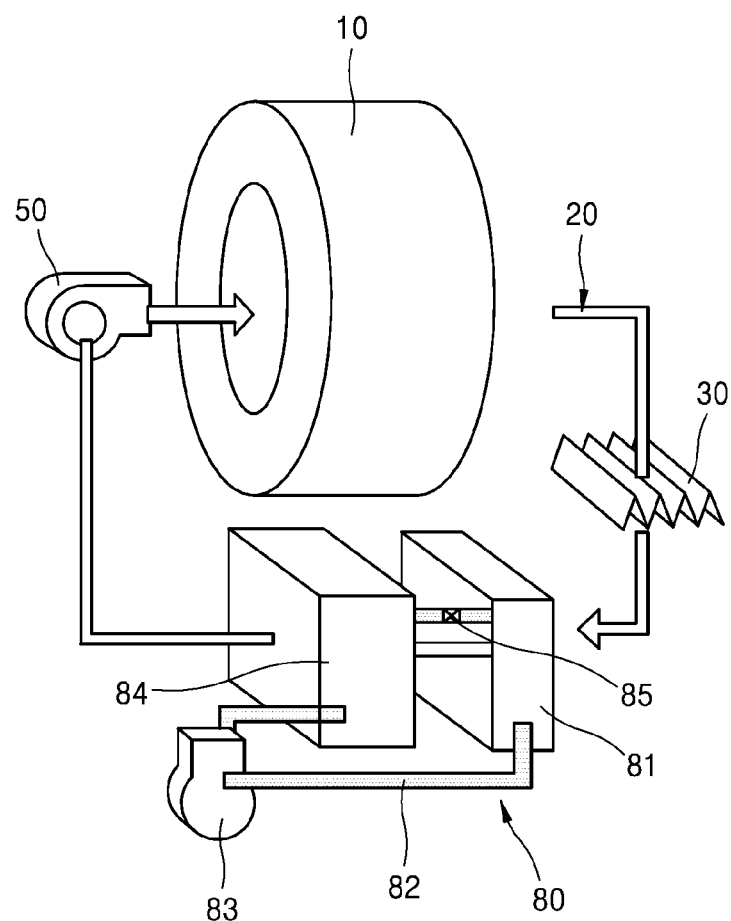
FIG. 3 is a conceptual view illustrating an air circulation unit of an example heat pump drying machine.
Figure 4:
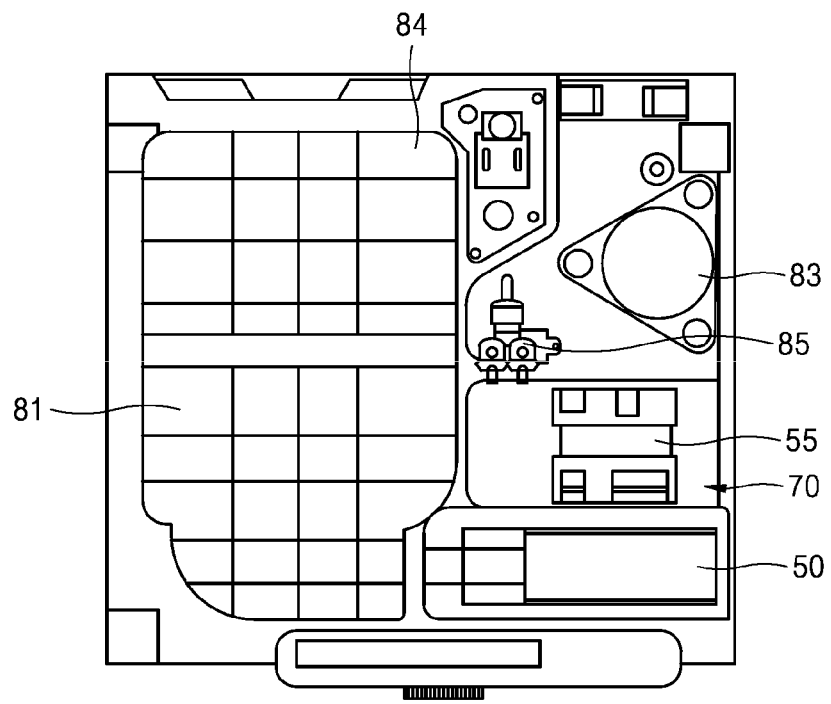
FIG. 4 is a plan view illustrating example base and peripheral components of the base of the heat pump drying machine of FIG. 3.
Figure 5:
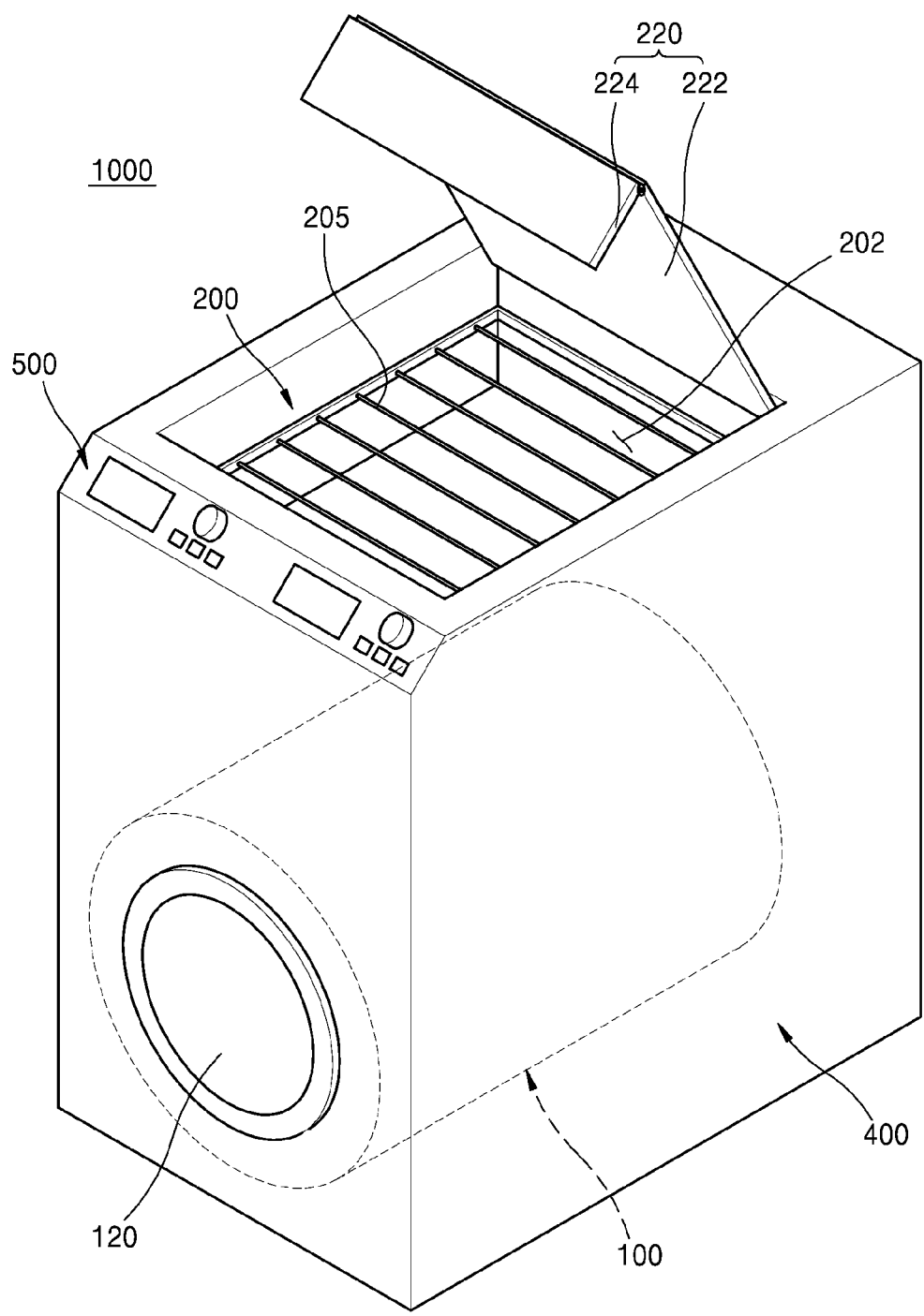
FIG. 5 is a perspective view showing an example dual type drying machine.

Referring to FIG. 5, the example dual type drying machine 1000 includes a main drying unit 100 having a relatively large capacity, an auxiliary drying unit 200 having a relatively small capacity, a cabinet 400 that surrounds the exterior of the main drying unit 100 and the exterior of the auxiliary drying unit 200, and an operation panel 500 for operating the main drying unit 100 and the auxiliary drying unit 200.

The main drying unit 100 for drying large-capacity laundry may be of a drum type. However, the main drying unit 100 of the present disclosure is not necessarily limited to the drum type.

In addition, the main drying unit 100 may include an opening/closing door 120 disposed at a front side thereof and may be of a horizontal shaft drum type in which laundry can be put into and taken out from the front side of the main drying unit 100. However, various modifications of shaft arrangement of a drum are possible.

The main drying unit 100 may be of a blowing type in which circulating air may be blown toward a rear side of the main drying unit 100, or a suction type in which the circulating air may be suctioned from the front side of the main drying unit 100. In some implementations, the direction of the circulating air may be different from the above description. That is, a structure in which the circulating air moves to the rear side from the front side of the main drying unit 100, can also be applied to the main drying unit 100.

In addition, an electric heater, a heat pump, or a gas type heater may be used as a heating unit of the main drying unit 100.

The auxiliary drying unit 200 may be disposed above the main drying unit 100. The auxiliary drying unit 200 may include an opening/closing door 220 disposed at a top surface thereof, and provide a structure in which the laundry can be put into and taken out from the top surface of the auxiliary drying unit 200.

The auxiliary drying unit 200 for drying laundry having a relatively small capacity may be of a cabinet type.

The cabinet type is a type in which the laundry is accommodated and is dried by supplying heated air to the laundry. When a laundry accommodation space has a box shape with a low height, relatively uniform drying can be attained.

A stand, or rack, 205 on which the laundry can be hung or placed, may be provided in the auxiliary drying unit 200. The rack 205 may be attached to or detached from the auxiliary drying unit 200. Attachment and detachment of the rack 205 may be required to dry thick laundry, because it is convenient to remove the rack 205 even during internal cleaning. The rack 205 may include apertures through which air in the auxiliary drying unit can pass. For example, the rack 205 may have a shape of a grille net but may have a shape of a punching plate or screen net.

In some implementations, the installation height of the rack 205 may be adjusted. The rack 205 may have a structure in which it protrudes slightly from inner walls of the auxiliary drying unit 200 and a plurality of props on which the rack 205 may be put, are spaced apart from one another in a vertical direction, or a structure in which the rack is guided to a rail that extends in the vertical direction and can be fixed to an arbitrary location of the rail by using a locking unit.

The opening/closing door 220 of the auxiliary drying unit 200 performs a function of opening/closing an opened side of an upper portion of a laundry accommodation unit 202. The opening/closing door 220 may include a first door 222 coupled to a rear side of the laundry accommodation unit 202, for example, by using a hinge, and a second door 224 coupled to the first door 222, for example, by using a hinge.

Shafts of the two hinges may be parallel to each other so that the first door 222 and the second door 224 are tilted upwards in a foldable manner. Thus, when the opening/closing door 220 is open, the overall height of the auxiliary drying unit 200 may not excessively increase, and the opened side of the laundry accommodation unit 202 can be fully accessible. The shafts of the two hinges may be parallel to a front surface of the cabinet so that the first and second doors are foldable in a front-to-back direction. In some implementations, the shafts of the two hinges may be perpendicular to a front surface of the cabinet so that the first and second doors are foldable in a side-to-side direction.

In some cases, at least the first door 222 may be formed of a transparent or semi-transparent material so that a user can check whether laundry is loaded in the laundry accommodation unit 202 or not, through the transparent or semi-transparent part of the first door 222 or check a drying state of the laundry.

In some implementations, the main drying unit 100 and the auxiliary drying unit 200 operate independently. In other words, only the main drying unit 100 or the auxiliary drying unit 200 may operate, or both of the main drying unit 100 and the auxiliary drying unit 200 may operate simultaneously.

For example, only the main drying unit 100 may operate so as to dry the large-capacity laundry, and only the auxiliary drying unit 200 may operate so as to dry the small-capacity laundry. In addition, when a part of the large-capacity laundry is separated from the whole laundry so as to be dried, the part of laundry to be dried is put into the auxiliary drying unit 200, and the remaining laundry may be put into the main drying unit 100 and then, both the auxiliary drying unit 200 and the main drying unit 100 may be operated together.

Operations of the main drying unit 100 and the auxiliary drying unit 200 may be controlled by the operation panel 500.

The operation panel 500 may be disposed on an upper portion of a front side of the drying machine 1000. The operation panel 500 disposed on the upper portion of the front side of the drying machine 1000 may be convenient for a user access and an operation state check.

The operation panel 500 may be connected to the main drying unit 100 via an interconnection and the auxiliary drying unit 200 via an interconnection.

When both the main drying unit 100 and the auxiliary drying unit 200 operate, heat may be generated therein. Paths of the interconnections and a distance between the interconnections may vary according to the location of the operation panel 500. Considering these points, the operation panel 500 may be disposed on an upper portion of a front side of the auxiliary drying unit 200.

The cabinet 400 may form the exterior of the main drying unit 100 and the exterior of the auxiliary drying unit 200 and provide structural rigidity of the drying machine 1000.

Because the area of the opening/closing door 120 of the main drying unit 100 with respect to a front side of the cabinet 400 is large, structural rigidity may be provided by a lateral panel.

Figure 6:
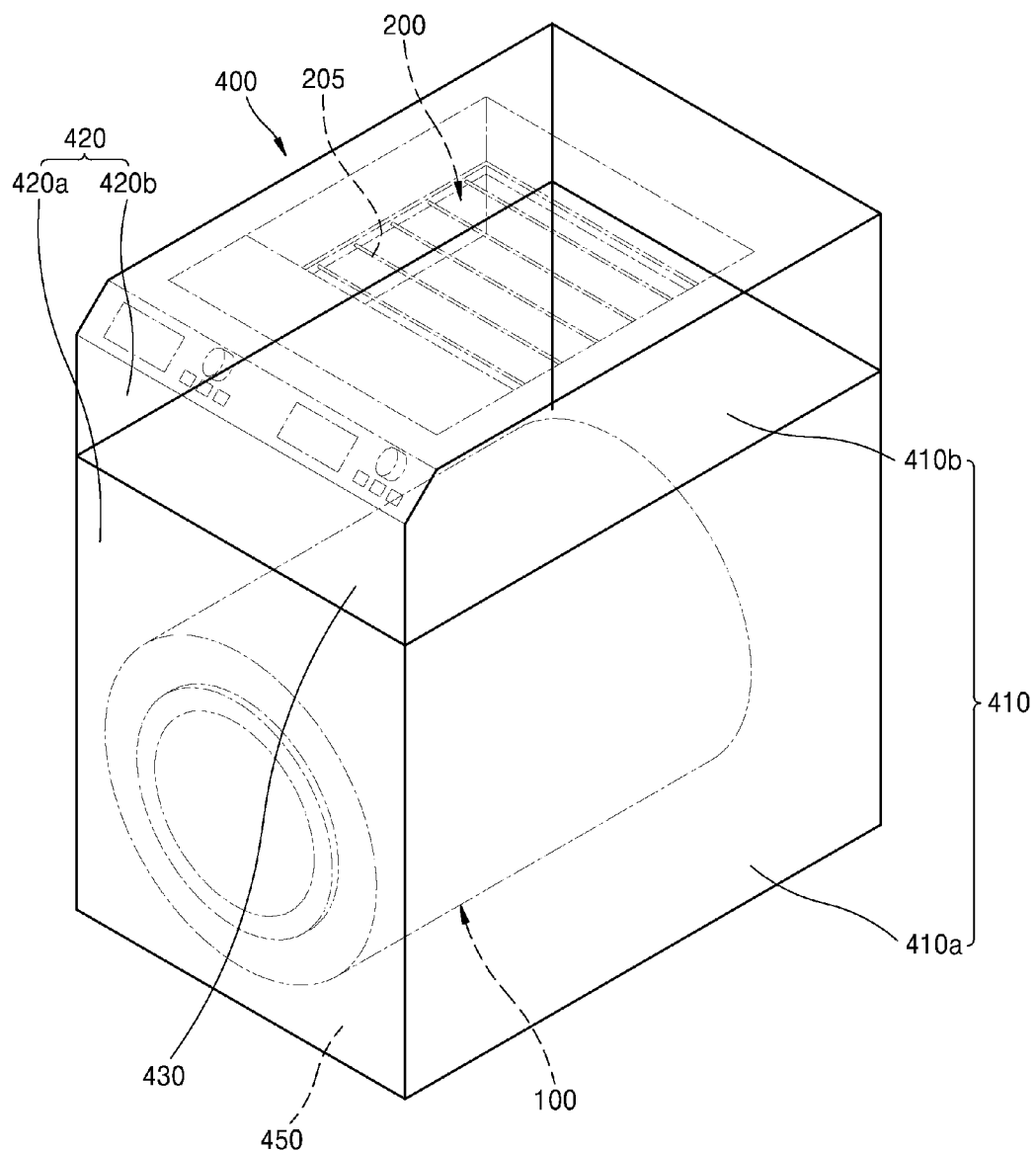
FIG. 6 is a perspective view showing an example cabinet of the example dual type drying machine.

FIG. 6 is a view for describing a structure of an example cabinet of the example dual type drying machine.

The example dual type drying machine provides a structure in which the main drying unit 100 disposed on a lower portion thereof and the auxiliary drying unit 200 disposed on an upper portion thereof are integrally formed in the cabinet 400.

The cabinet 400 may include a base 450 onto which a condenser and a drying fan of the lower main drying unit 100 are fixed, both lateral plates 410 and 420 that surround both sides of the main drying unit 100 and the auxiliary drying unit 200, and an intermediate plate 430 that connects the both lateral plates 410 and 420 while crossing between the main drying unit 100 and the auxiliary drying unit 200.

The rigidity of the main drying unit 100 may be provided by a box shape formed by the base 450, the both lateral plates 410 and 420, and the intermediate plate 430, and the structural rigidity of the auxiliary drying unit 200 may be provided by an upwardly-open U-shaped structure including the both lateral plates 410 and 420, and the intermediate plate 430.

The both lateral plates 410 and 420 may include divided lateral plates, for example, lower lateral plates 410a and 420a that constitute lateral sides of the main drying unit 100, and upper lateral plates 410b and 420b that constitute lateral sides of the auxiliary drying unit 200.

In cases where the lateral plates are divided into upper lateral plates and lower lateral plates, a process of manufacturing the main drying unit 100 and a process of manufacturing the auxiliary drying unit 200 can be separately performed in the manufacturing process, and components can be commonly used in the two processes.

In some implementations, the dual type drying machine may have a structure in which the lower main drying unit 100 and the upper auxiliary drying unit 200 operate independently, and integration of the main drying unit 100 and the auxiliary drying unit 200 is performed by the cabinet 400.

In some implementations, the lateral plates 410 and 420 are divided into the lower lateral plates 410a and 420a that constitute the lateral sides of the main drying unit 100 and the upper lateral plates 410b and 420b that constitute the lateral sides of the auxiliary drying unit 200, and an assembling process of the main drying unit 100 and an assembling process of the auxiliary drying unit 200 can be independently performed.

For example, the main drying unit 100 may be assembled in a module shape with the base 450, the lower lateral plates 410a and 420a and the intermediate plate 430 as a framework, and the auxiliary drying unit 200 may be assembled in a module shape with the upper lateral plates 410b and 420b and an upper plate as a framework, and then, the assembled modules may be coupled to each other.

In this case, a structure in which single components are coupled to each other, may be applied to a front panel that constitutes the exterior of the front side of the drying machine in consideration of design and assembling property. The lateral plates that form the exterior of the drying machine are less exposed than the front side. In case where the front side forms the main exterior of the drying machine, in consideration of design quality, the front case may not be divided but be integrally formed. In some cases, the front case may also be divided into a main drying unit and an auxiliary drying unit.

In terms of assembling, the main drying unit and the auxiliary drying unit are manufactured in a module shape and are coupled to each other so that an integral type front panel can be assembled to the coupled drying units.

As described above, the main drying unit 100 and the auxiliary drying unit 200 may operate independently. The main drying unit 100 may be of a drum type, and various heating units may be applied to the main drying unit 100, and a suction type or blowing type may be applied to an air circulation structure.

Hereinafter, various example auxiliary drying units of the dual type drying machine will be described.

Figure 7:
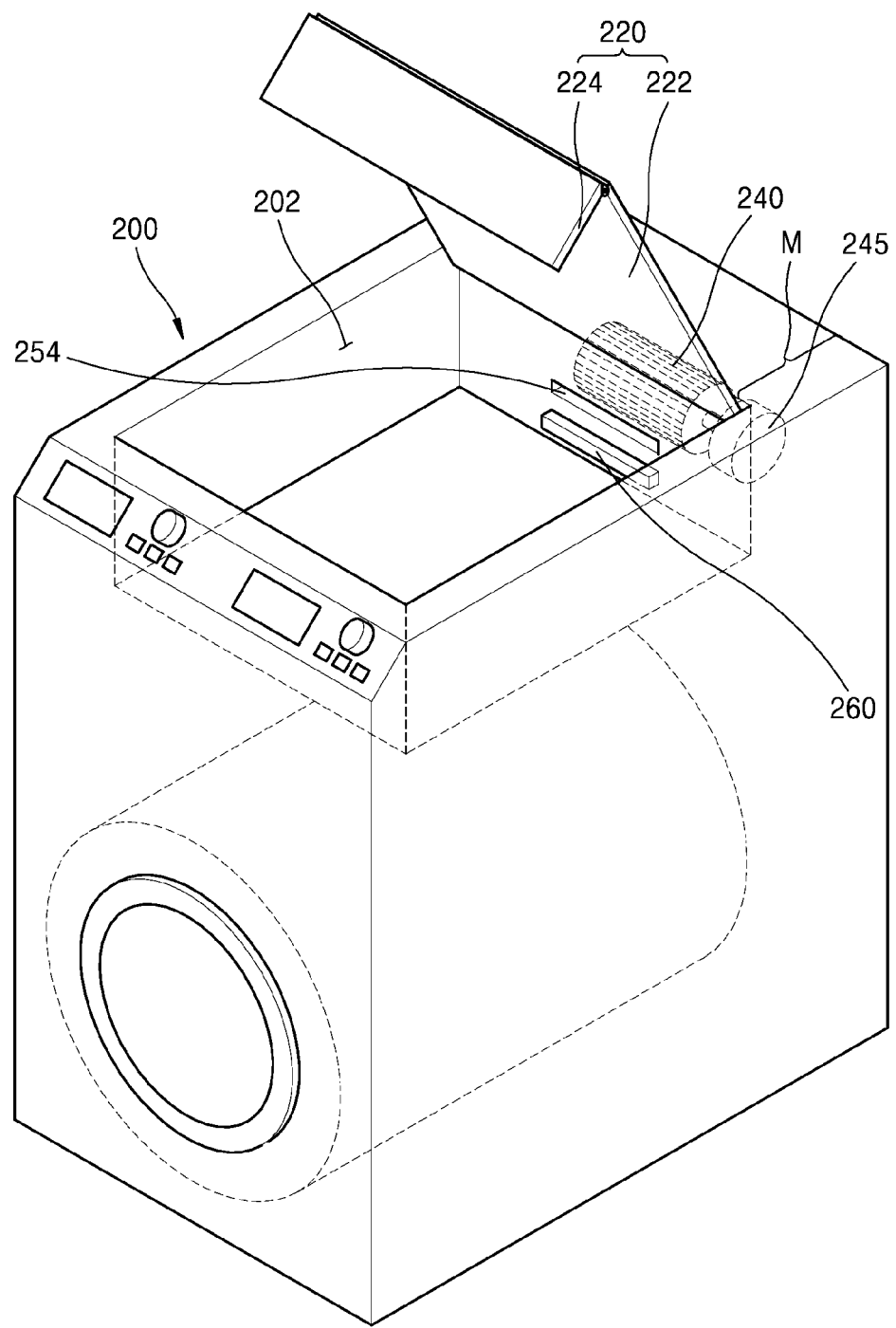
FIG. 7 is a perspective view showing an example auxiliary drying unit.
Figure 8:
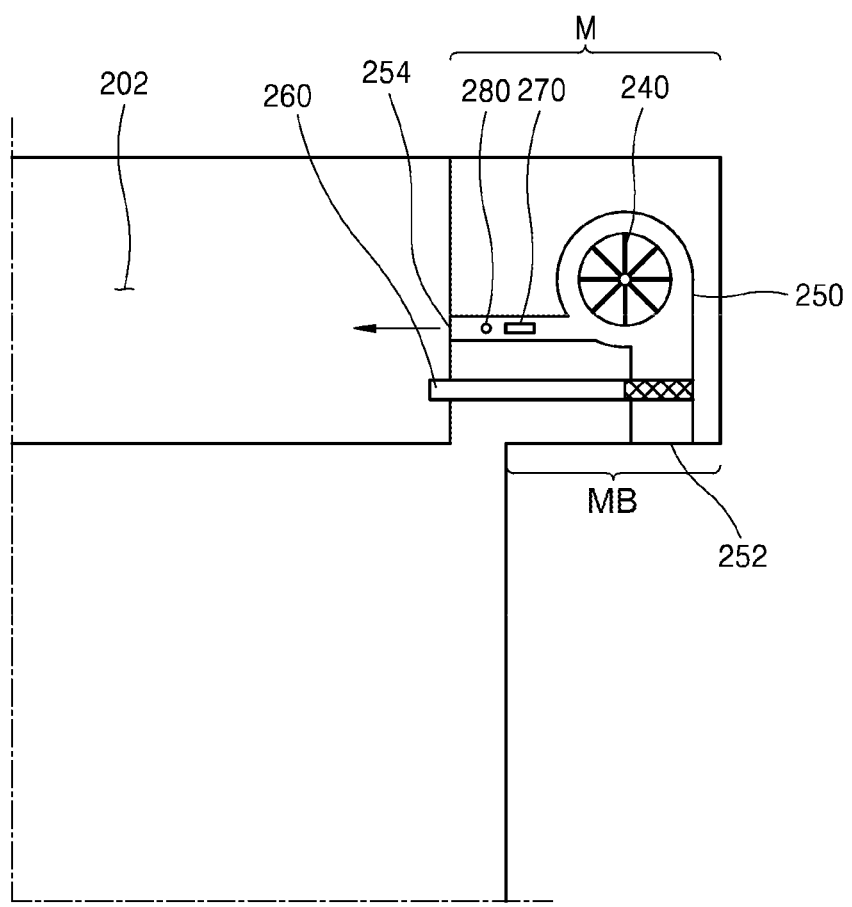
FIG. 8 is a cross-sectional view showing an example internal structure of the example auxiliary drying unit of FIG. 7.
Figure 9:
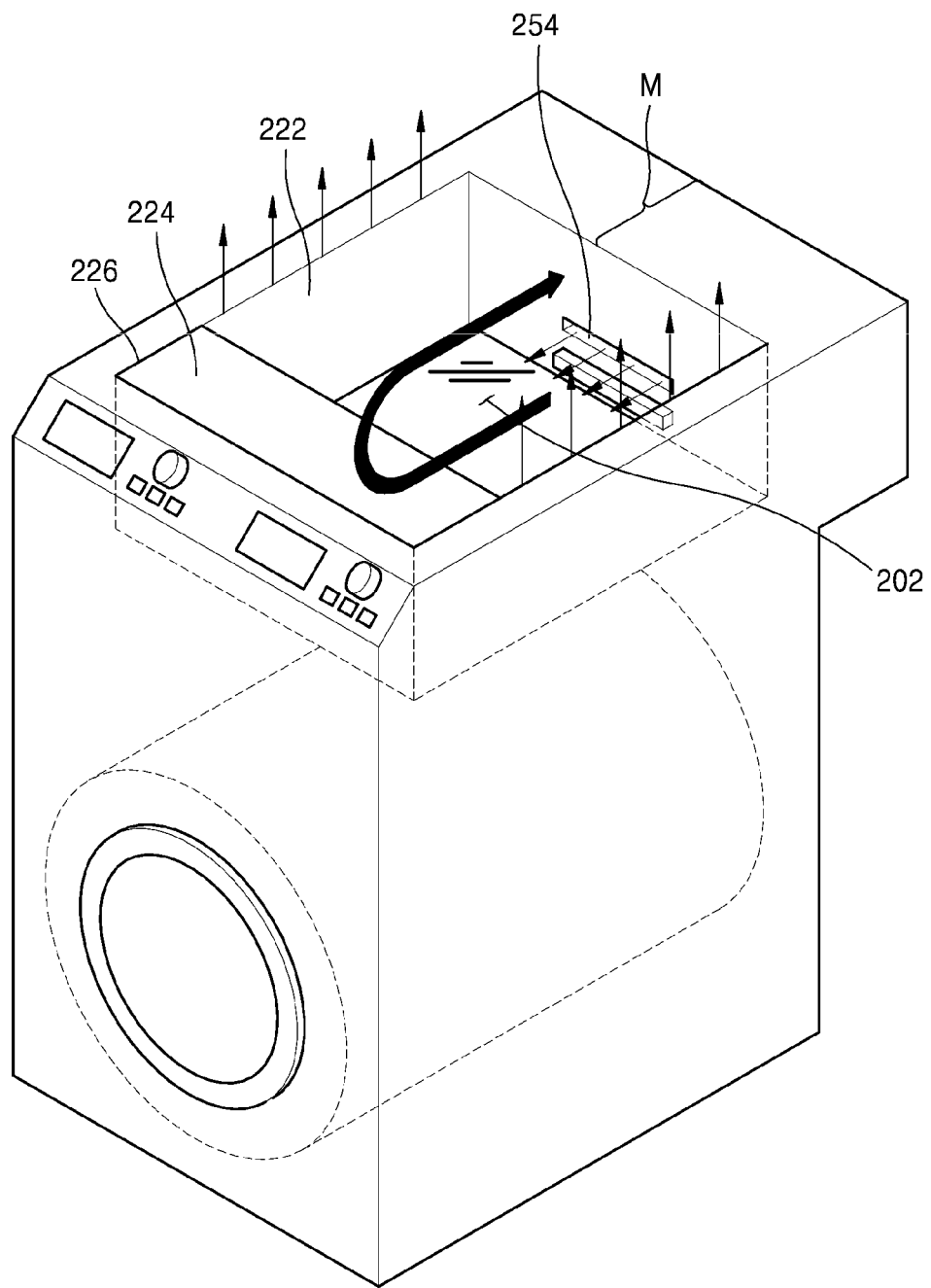
FIG. 9 is a perspective view showing an example air flow in the example auxiliary drying unit of FIG. 7.

FIG. 7 is a perspective view for describing an example auxiliary drying unit, FIG. 8 is a cross-sectional view for describing an internal structure of the example auxiliary drying unit, and FIG. 9 is a view for describing an example air flow in the example auxiliary drying unit.

Referring to FIG. 7, the auxiliary drying unit 200 of the dual type drying machine may be of a cabinet type and may include the laundry accommodation unit 202 in which laundry is accommodated, and a machine compartment M in which a blower fan 240 for supplying heated air to the laundry accommodation unit 202, a driving motor 245 and an air intake flow path 250 are disposed.

The machine compartment M may be disposed rearward of the laundry accommodation unit 202.

Because a rear side of the drying machine is generally installed close to a wall surface, by having the machine compartment M rearward of the laundry accommodation unit 202, it may be easy for the user to approach the laundry accommodation unit 202, and design advantages may be attained.

In some implementations, a rear side of the machine compartment M of the auxiliary drying unit 200 may protrude backwards further than the rear side of the main drying unit 100. In other words, a rear side of the auxiliary drying unit 200 may protrude backwards further than the rear side of the main drying unit 100. This shape may form a stepped surface MB on a lower portion of the machine compartment M. The stepped surface MB is open toward a bottom surface of the machine compartment M even when the rear side of the machine compartment M is close to an installation wall surface.

In some implementations, when an air intake inlet 252 is disposed in the stepped surface MB, even when the drying machine is installed close to the wall surface, external air can be smoothly introduced through the air intake inlet 252.

In addition, even when the dual type drying machine is installed close to the installation wall surface due to this structure, the rear side of the main drying unit 100 is spaced apart from the installation wall surface by a predetermined distance. This may cause smooth air flow toward the rear side of the main drying unit 100.

Further referring to FIG. 8, the driving motor 245, the blower fan 240, a heater 270, a temperature sensor 280, a filter 260, and the air intake flow path 250 are disposed inside the machine compartment M.

The blower fan 240 rotates by the driving motor 245. The blower fan 240 is disposed inside the air intake flow path 250 and causes air inside the air intake flow path 250 to flow.

When the blower fan 240 rotates, the external air is introduced into the air intake flow path 250 through the air intake inlet 252 and then is discharged to an air intake outlet 254. The air intake outlet 254 may be disposed at the rear side of the laundry accommodation unit 202. In some implementations, by an operation of the blower fan 240, the external air is suctioned and supplied to the laundry accommodation unit 202.

In some implementations, the filter 260 may be disposed at a rear end of the air intake inlet 252 on the air intake flow path 250. The filter 260 may filter foreign substances introduced into the air intake flow path 250 together with the external air. The filter 260 may be disposed in a backward direction of air flow rather than the air intake inlet 252 and may be disposed at an upstream side of the fan 240 and the heater 270 to thereby prevent foreign substances or dust from being attached to the fan 240 and the heater 270. The filter 260 may be installed in parallel to the air intake inlet 252 of the air intake flow path 250.

The filter 260 may require maintenance such as regular cleaning or replacement. Thus, in consideration of approaching for maintenance, the filter 260 may pass through the rear side of the laundry accommodation unit 202 and may be attached to or detached from the laundry accommodation unit 202.

In some implementations, the heater 270 and the temperature sensor 280 may be disposed inside the air intake flow path 250.

An electric heater may be applied to the heater 270. For the auxiliary drying unit 200 with relatively low capacity, the electric heater may be suitable for the heater 270 rather than a gas type heater or heat pump. The electric heater has a relatively simple configuration and a small size so that the volume of the electric heater inside the drying machine can be compact and cost thereof can be low.

The temperature sensor 280 may measure the temperature of air heated by the heater 270. The temperature sensor 280 may be disposed behind the electric heater 270 on a flow path of the air and measure the temperature of the air that passes through the heater 270. The measured temperature of the air may be used as a factor for controlling the heater 270 and monitoring whether the heater 270 is overheated or not. That is, the temperature sensor 280 may measure the temperature of the air that flows inside the air intake flow path 250 and transfer the measured temperature of the air to a controller. The controller may adjust an output of the heater 270 according to the temperature measured by the temperature sensor 280 so that the air at a set temperature can be supplied to the laundry accommodation unit 202.

In some cases, when smooth air flow is not performed inside the air intake flow path 250 due to, for example, damage or trouble of the fan 240 or the driving motor 245 or overheating of the heater 270, there is a concern about the occurrence of trouble or fire. Therefore, when the temperature measured by the temperature sensor 280 exceeds a reference value, the controller may cut off power of the heater 270, indicate an error message, and turn on an alarm to inform the current state to the user visually and/or auditorily.

Referring to FIG. 9, the air intake outlet 254 through which the heated air supplied from the machine compartment M is introduced, may be provided at the rear side of the laundry accommodation unit 202.

The air intake outlet 254 may be disposed at the rear side of the laundry accommodation unit 202 in a transverse slit shape.

In some cases, the laundry accommodation unit 202 may have a box shape with a small height and a large horizontal area, and the air intake outlet 254 may have a transverse slit shape so as to uniformly supply heated air to the inside of the laundry accommodation unit 202.

The auxiliary drying unit 200 may have a structure in which the air introduced into the laundry accommodation unit 202 is discharged by natural exhaust, and thus the auxiliary drying unit 200 may not include an additional exhaust flow path.

When the heated air is introduced into the laundry accommodation unit 202 and pressure inside the laundry accommodation unit 202 increases, the air inside the laundry accommodation unit 202 may be naturally ventilated into a gap between the laundry accommodation unit 202 and the opening/closing door 220. In this case, the auxiliary drying unit 200 may include a sealing unit 226 (thick line) to thereby prevent natural exhaust from occurring in a forward direction of the drying machine. This may prevent hot air from being discharged toward the user when the user is in front of the drying machine.

In terms of the air flow, the air discharged from the rear of the drying machine moves forwards due to inertia and ascends. An ascending amount may increase from a portion where horizontal speed decreases due to inertia.

When the ascending air at the front of the drying machine is directly discharged by natural exhaust, the heated air may not be smoothly supplied to the rear of the drying machine.

In some implementations, the sealing unit 226 may be disposed at a front portion of the drying machine so that the air reaches a front side of the laundry accommodation unit 202 and then returns backwards and is discharged. For example, the front portion may be the second door 224 of the opening/closing door 220.

Figure 10:
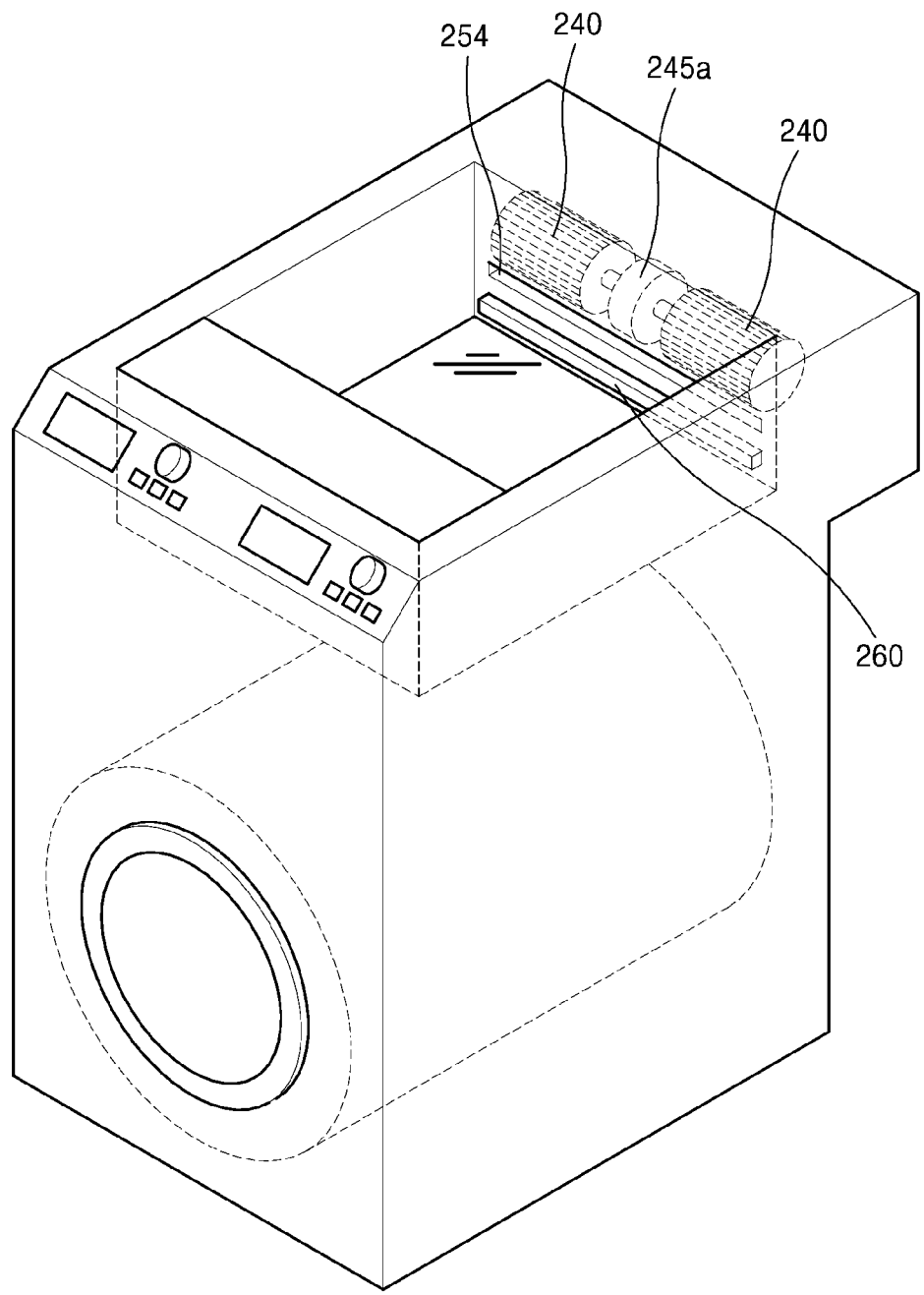
FIG. 10 is a perspective view showing a configuration of an example auxiliary drying unit according to another implementation.

FIG. 10 is a view of a configuration of another example auxiliary drying unit.

In this example auxiliary drying unit, two blower fans 240 may be provided so as to more uniformly supply more heated air into the laundry accommodation unit 202. A heater and a temperature sensor may be disposed at a downstream side of each of the blower fans 240. In some implementations, one blower fan 240 may be formed long.

In the long one blower case, a structure against a sagging phenomenon of the blower fan 240 may be additionally necessary.

As illustrated in FIG. 10, when a double shaft motor is used as a driving motor 245a, the blower fan 240 may be connected to both shafts of the driving motor 245a, and the driving motor 245a may be provided in the center of the machine compartment M and the blower fan 240 is disposed at both sides of the driving motor 245a. The heated air may be discharged from the rear side of the laundry accommodation unit 202. FIG. 10 illustrates an example structure in which one air intake outlet 254 extends long in a left/right direction. That is, the structure may be a structure in which two blower fans share one air intake outlet 254. In some implementations, one air intake outlet may correspond to one blower fan.

Similarly, an air intake inlet may be shared by two blower fans or may be disposed to correspond to one blower fan. When one air intake inlet is provided, one filter may be provided so that the filter can be conveniently cleaned.

Figure 11:
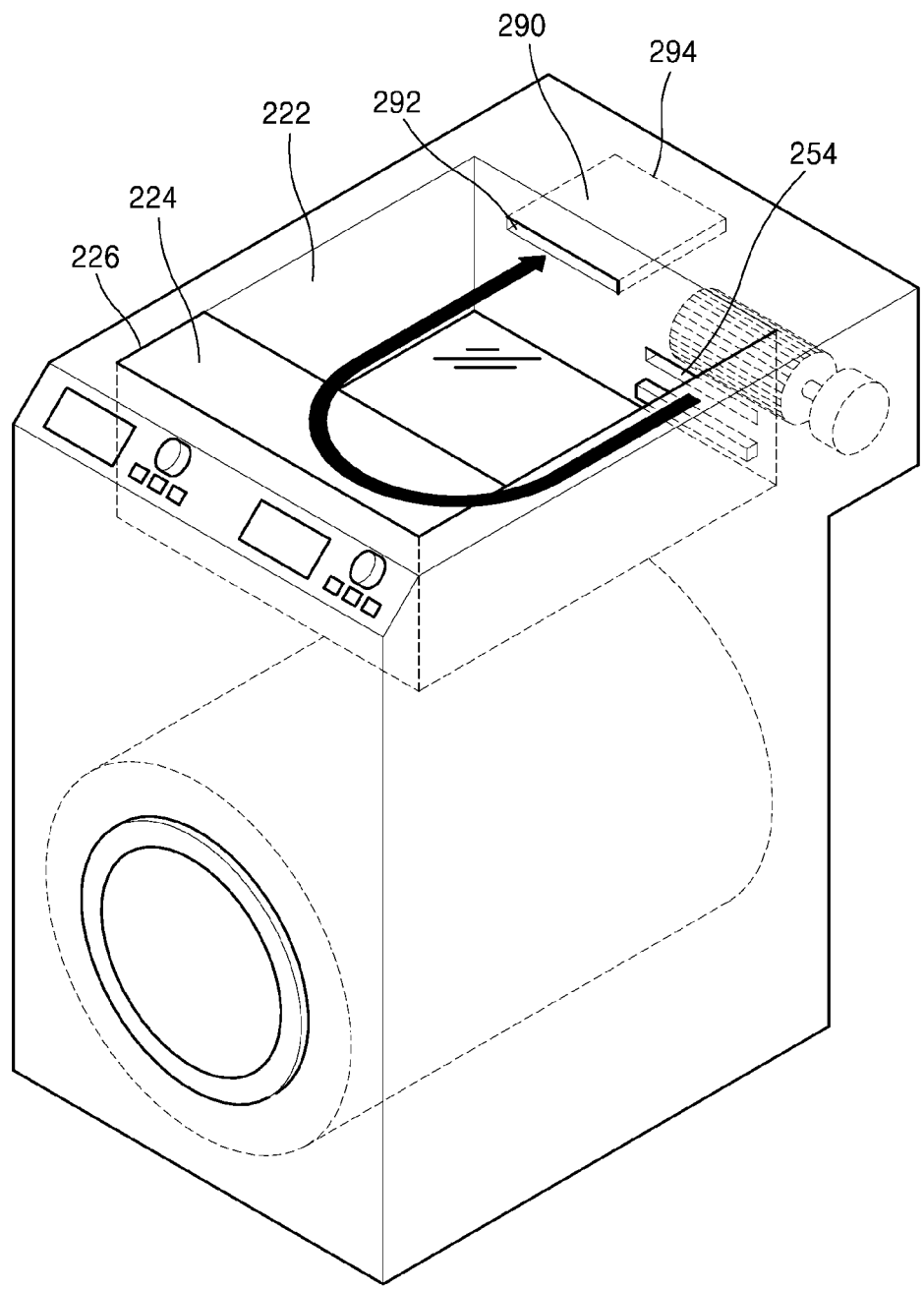
FIG. 11 is a perspective view of showing a configuration of an example auxiliary drying unit according to another implementation.

FIG. 11 is a view of a configuration of another example auxiliary drying unit.

This example auxiliary drying unit 200 may further include an exhaust flow path 290 that guides discharge of the air.

In this case, a gap between an opening of a top surface of the laundry accommodation unit 202 and the opening/closing door 220 may be sealed by a sealing unit 226.

The heated air may ascend due to natural convection and have a temperature distribution in which a temperature of an upper portion of the heated air is higher than that of a lower portion of the heated air. Thus, the sealing unit reduces discharging of the heated air upwards so that drying efficiency can be enhanced.

As illustrated in FIG. 11, the air intake outlet 254 may be disposed at one side of the rear of the laundry accommodation unit 202, and an exhaust inlet 292 of the exhaust flow path 290 may be disposed at the other side of the rear of the laundry accommodation unit 202.

Through this arrangement, the heated air discharged from the air intake outlet 254 may circulate at the front side of the laundry accommodation unit 202 and be discharged through the exhaust inlet 292 at the rear side of the laundry accommodation unit 202. In order to prevent the heated air introduced into the laundry accommodation unit 202 from the air intake outlet 254 from being immediately discharged through the exhaust inlet 292, a blower type air flow structure may be used so that a discharge speed of the air introduced into the laundry accommodation unit 202 from the air intake outlet 254 can be increased. Also, a nozzle or vein structure may be further disposed near the air intake outlet 254 so as to increase the air discharge speed at the air intake outlet 254 and to improve linearity of the discharged air.

In the drawings, for example, an exhaust outlet 294 of the exhaust flow path 290 is shown disposed at the rear side of the laundry accommodation unit 202. In some implementations, the exhaust outlet 294 may also be disposed at a top surface of the laundry accommodation unit 202 or the stepped surface MB.

In addition, in the current disclosure, the air intake outlet 254 and the exhaust inlet 292 are disposed at different positions (orthogonal positions) such as in upward/downward and left/right directions of the rear side of the laundry accommodation unit 202. In some implementations, the air intake outlet 254 and the exhaust inlet 292 may be disposed to be separated from each other in the upward/downward direction in the center of the laundry accommodation unit 202 or may be disposed to be separated from each other in the left/right direction at the same height.

When the air intake outlet 254 and the exhaust inlet 292 are disposed at divided in the upward/downward locations, vertical division may be performed by a rack 205 (see FIG. 5).

This may assist a more effective contact of the flow of the internal air with the surface of the laundry held on the rack.

Figure 12:
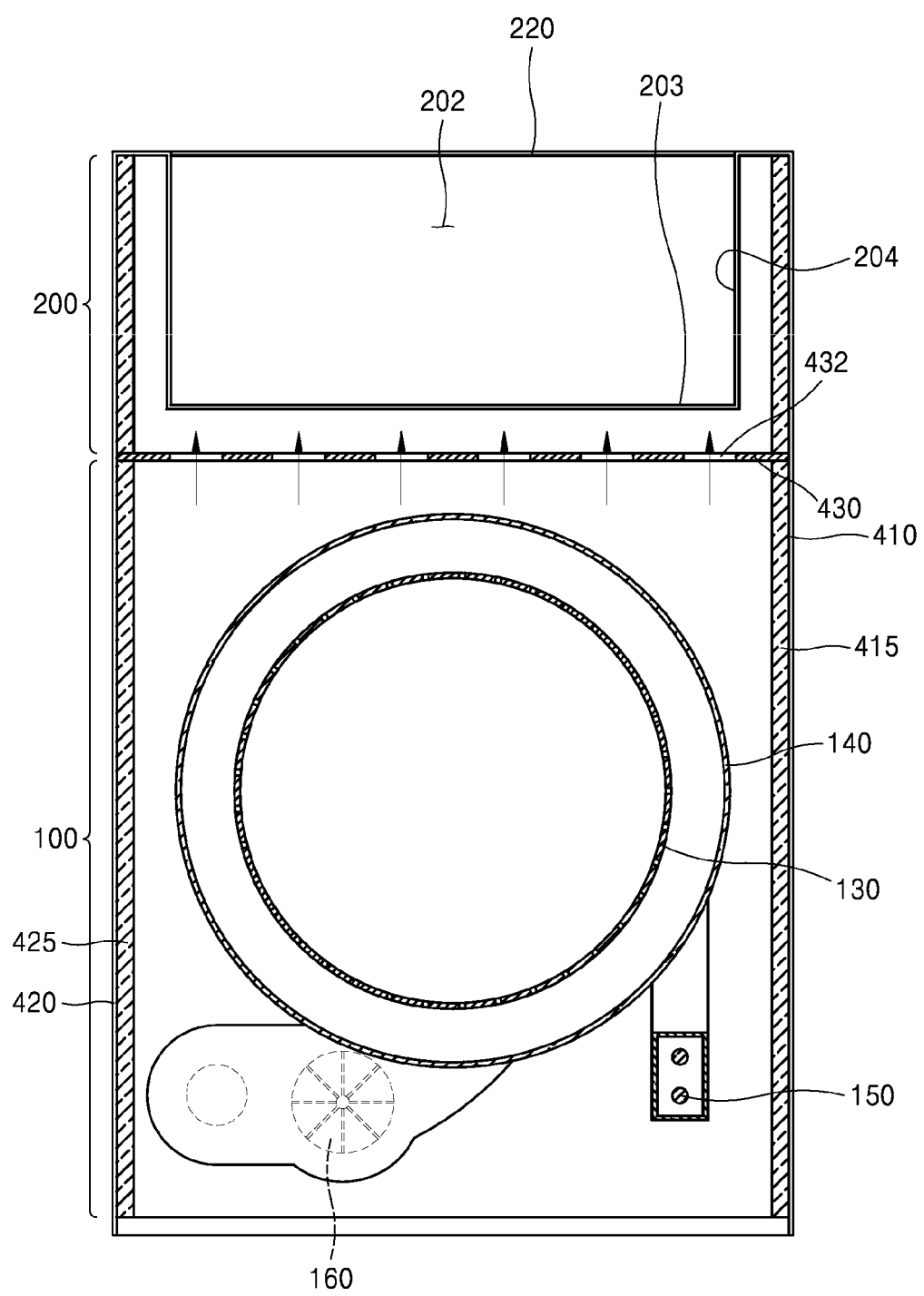
FIG. 12 is a cross-sectional view showing an example dual type drying machine according to another implementation.

FIG. 12 is a cross-sectional view of another example dual type drying machine.

This example dual type drying machine include may through holes 432 formed in the intermediate plate 430 so that the heated air inside the main drying unit 100 can be transferred to the auxiliary drying unit 200 via the through holes 432.

The heated air ascends due to natural convection and is introduced into the auxiliary drying unit 200.

The laundry accommodation unit 202 of the auxiliary drying unit 200 has a bottom surface 203 and side surfaces 204, and the opening/closing door 220 is placed at an open side of an upper portion of the auxiliary accommodation unit 202.

As illustrated in FIG. 12, the heated air inside the main drying unit 100 may pass through the through holes 432 of the intermediate plate 430 and may be introduced into the auxiliary drying unit 200. The air introduced into the auxiliary drying unit 200 heats the bottom surface 203 and the side surfaces 204 of the laundry accommodation unit 202.

Because the heated air inside the main drying unit 100 is transferred to the auxiliary drying unit 200, outflow of the heated air inside the main drying unit 100 toward lateral plates of the cabinet may be reduced. In some cases, insulation units 415 and 425 may be provided inside the both lateral plates 410 and 420, as illustrated in FIG. 12. In this case, the insulation units 415 and 425 may be attached to only portions corresponding to sides of the main drying unit 100 and may also be attached to portions corresponding to sides of the auxiliary drying unit 200.

Figure 13:
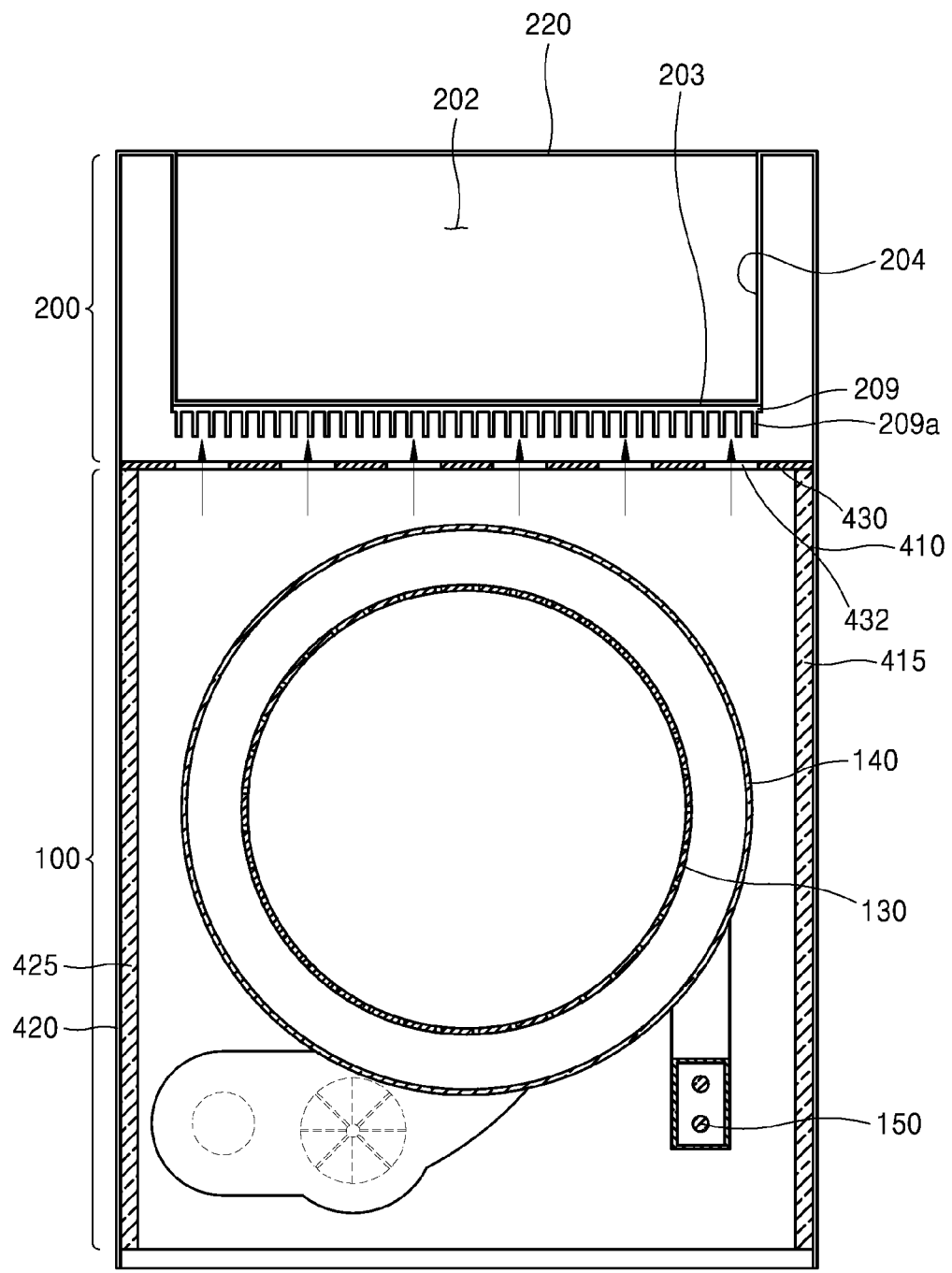
FIG. 13 is a cross-sectional view showing an example dual type drying machine according to another implementation.

FIG. 13 is a cross-sectional view of another example dual type drying machine.

This example dual type drying machine may include a heat absorption plate 209 provided on the bottom surface 203 of the laundry accommodation unit 202 of the auxiliary drying unit 200. The heat absorption plate 209 may include a heat absorption fin 209a that enlarges a contact area between the heat absorption plate 209 and the air to improve heat absorption effect. In this case, the heat absorption fin 209a may protrude toward the intermediate plate 430.

Thus, the heated air inside the main drying unit 100 passes through the through holes 432 of the intermediate plate 430 and moves into the auxiliary drying unit 200, and the heated air inside the auxiliary drying unit 200 can transfer heat to the heat absorption plate 209.

The heat absorption plate 209 is attached to the bottom surface 203 of the laundry accommodation unit 202 and heats the bottom surface 203 of the laundry accommodation unit 202.

In this example case, the heat absorption plate 209 is attached to only the bottom surface 203 of the laundry accommodation unit 202. In some implementations, the heat absorption plate 209 may also be attached to the side surfaces 204 of the laundry accommodation unit 202. In some cases, the heat absorption plate 209 and the bottom surface 203 may also be integrally formed.

Figure 14:
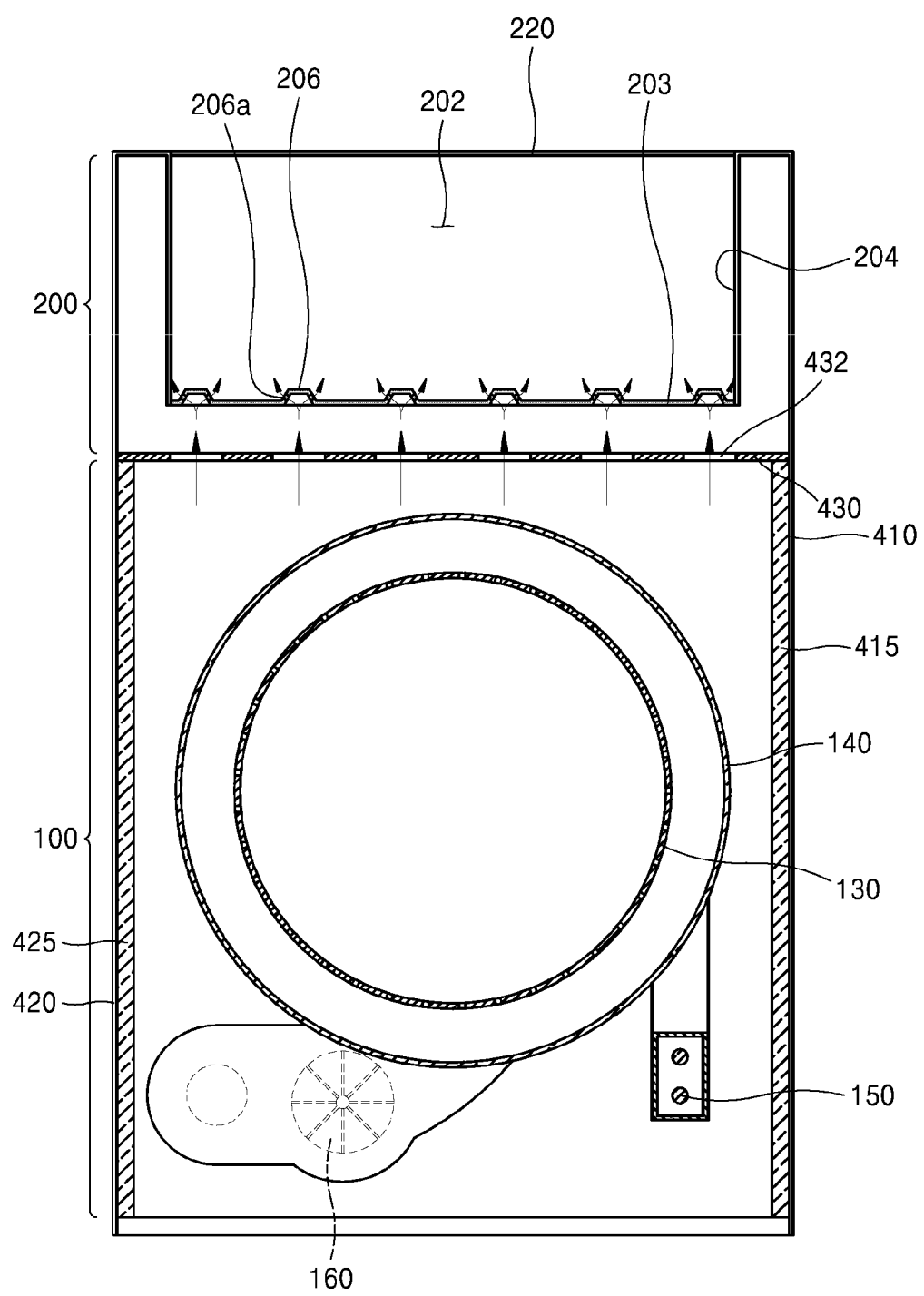
FIG. 14 is a cross-sectional view showing an example dual type drying machine according to another implementation.

FIG. 14 is a cross-sectional view of another example dual type drying machine.

This example dual type drying machine may include communication holes 206a formed in the bottom surface 203 of the auxiliary drying unit 200. This is to cause the heated air that moves through the communication holes 206a to be introduced into the laundry accommodation unit 202 of the auxiliary drying unit 200.

The communication holes 206a may be formed simply in the form of through holes. In some implementations, the communication holes 206a may be disposed in side surfaces of protrusions 206, as illustrated in FIG. 14. When the communication holes 206a are formed simply in the form of through holes, the through holes 432 formed in the intermediate plate 430 and the communication holes 206a provided in the bottom surface 203 of the laundry accommodation unit 202 may cross one another. In some cases, the through holes 432 and the communication holes 206a have the same size so that configurations inside the main drying unit 100 can be seen from the outside.

As illustrated in FIG. 14, when the protrusions 206 are provided on the bottom surface 203 of the auxiliary drying unit 200 and the communication holes 206a are disposed in side surfaces of the protrusions 206, positions and sizes of the communication holes 206a may be designed such that the flow of the supplied and heated air can be controlled.

In the drawings, for example, the protrusions 206 protrude toward an upper portion of the bottom surface 203. In some implementations, the protrusions 206 may protrude toward the intermediate plate 430 or the protrusions 206 may be disposed to protrude toward the upper portion of the bottom surface 203 and toward the intermediate plate 430.

Figure 15:
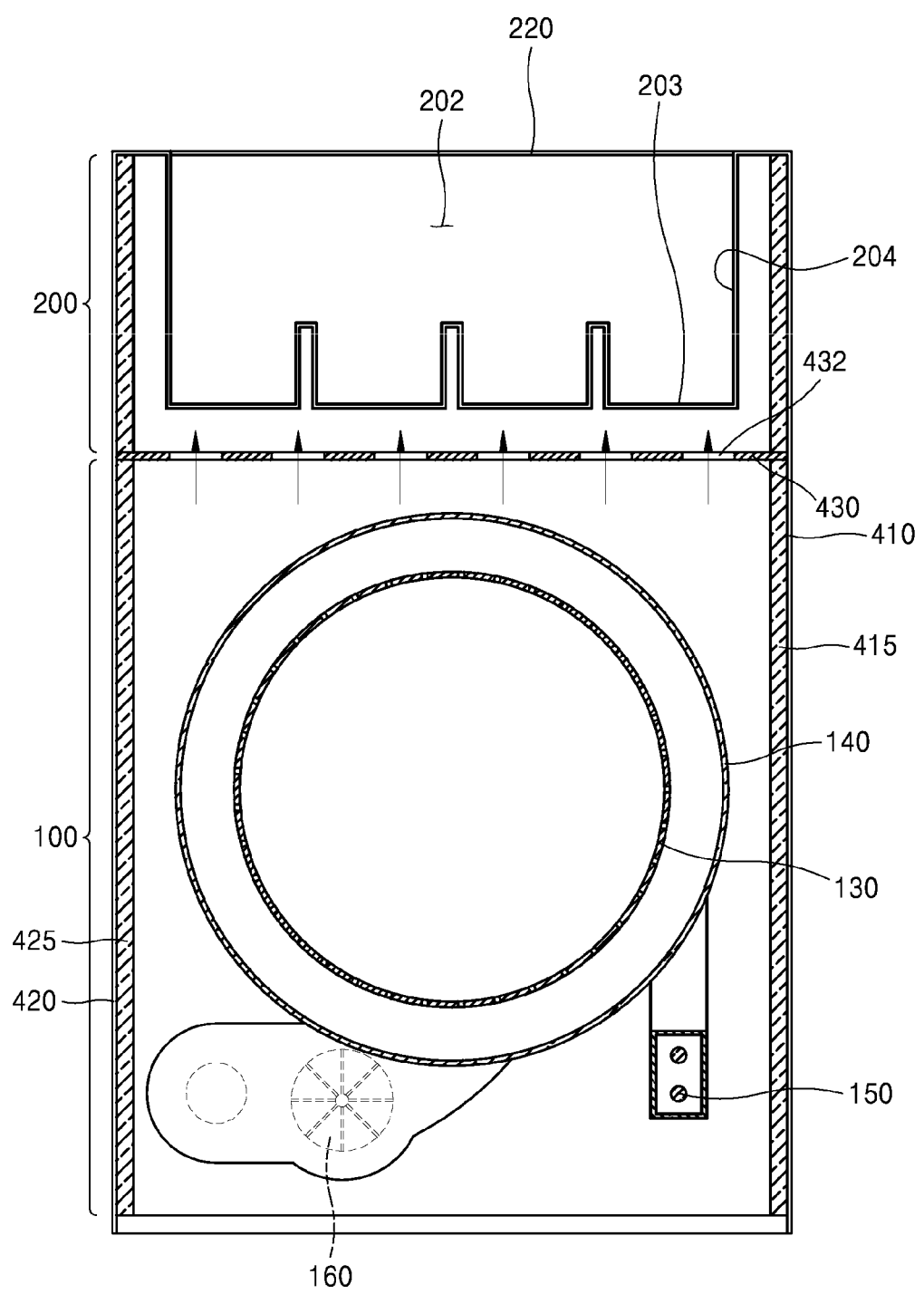
FIG. 15 is a cross-sectional view showing an example dual type drying machine according to another implementation.

FIG. 15 is a cross-sectional view of another example dual type drying machine.

In this example dual type drying machine, unevenness is included on the bottom surface 203 of the auxiliary drying unit 200. When unevenness is formed on the bottom surface 203 of the auxiliary drying unit 200, as illustrated in FIG. 15, the area in which the air inside the main drying unit 100 is in contact with the bottom surface 203 of the laundry accommodation unit 202 of the auxiliary drying unit 200, may be increased so that heat transfer effects can be enhanced.

Also, the space of the laundry accommodation unit 202 of the auxiliary drying unit 200 can be partitioned. The efficiency of transferring heat that moves into the laundry accommodation unit 202 through the bottom surface 203 of the auxiliary drying unit 200 can be improved. This is because the area in which the air inside the laundry accommodation unit 202 is in contact with the bottom surface 203, is increased. In this example, when the laundry is accommodated in the laundry accommodation unit 202 while being in close contact with the bottom surface 203, a drying time of the laundry can be reduced.

The uneven structure in the bottom surface 203 of the laundry accommodation unit 202 may be applied to the above-described other examples.

Figure 16:
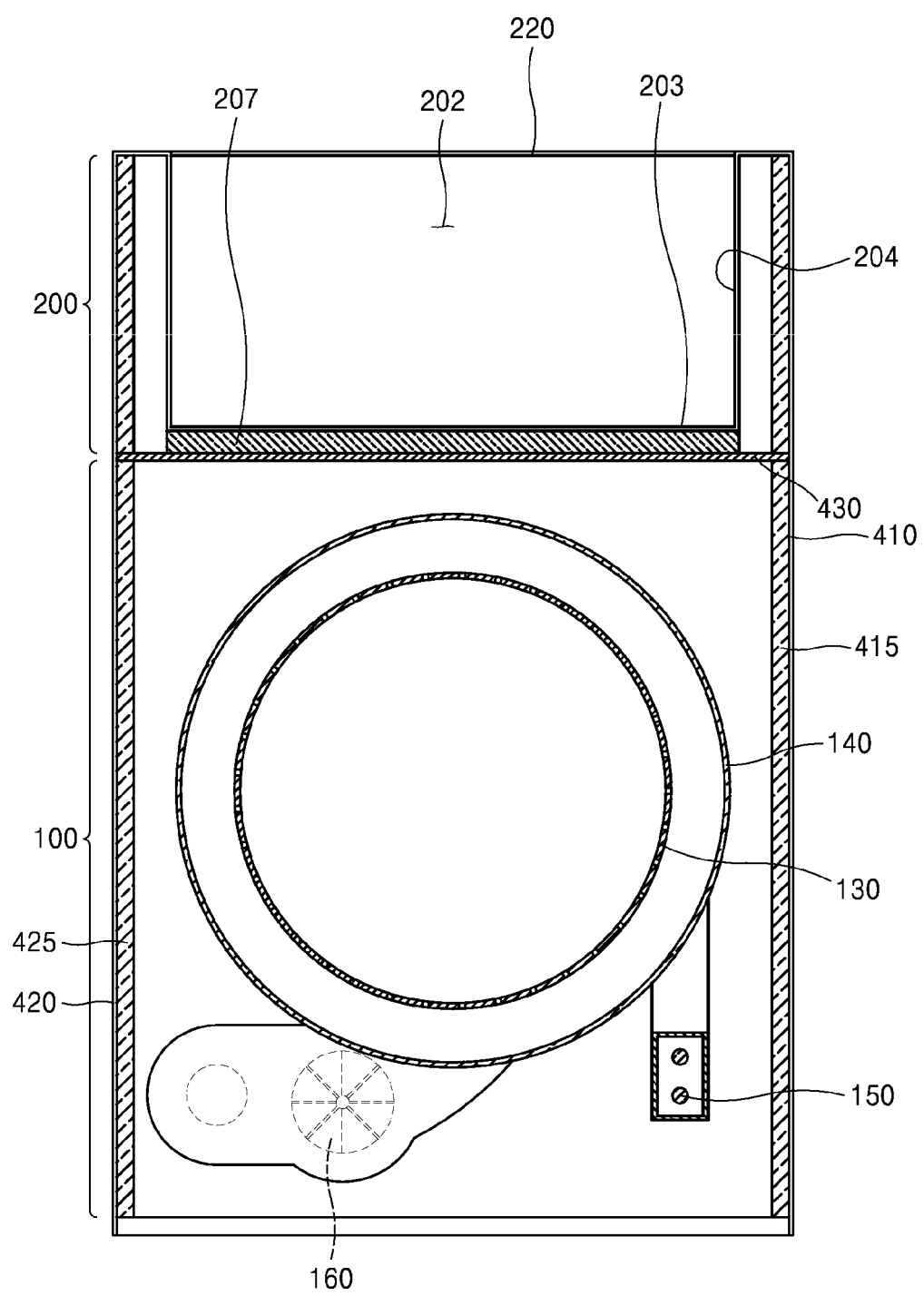
FIG. 16 is a cross-sectional view showing an example dual type drying machine according to another implementation.

FIG. 16 is a configuration view and a cross-sectional view for describing heat transfer of another example dual type drying machine.

This example dual type drying machine may include a heat absorption plate 207 disposed between the bottom surface 203 of the laundry accommodation unit 202 of the auxiliary drying unit 200 and the intermediate plate 430, wherein both sides of the heat absorption plate 207 are in surface contact with the bottom surface 203 of the laundry accommodation unit 202 and the intermediate plate 430.

In this example, the heated air inside the main drying unit 100 is not moved, but heat of the heated intermediate plate 430 passes through the heat absorption plate 207 and can be transferred to the bottom surface 203 of the laundry accommodation unit 202 through conduction.

In this case, a gap between the heat absorption plate 207 and the bottom surface 203 or a gap between the heat absorption plate 207 and the intermediate plate 430 may be filled with a viscous material, like heat transfer grease, to improve thermal conductivity, and the gap may be coated with a heat transfer fluid having a high thermal conductivity.

As described above, the example drying machines include a main drying unit for drying large-capacity laundry and an auxiliary drying unit for drying small-capacity laundry. The main drying unit and the auxiliary drying unit may be operated simultaneously or separately according to a user's selection. Thus, convenience of the use may be improved.

In addition, an operation panel may be disposed at a position in which the user easily approaches and easily operates the operation panel, and the auxiliary drying unit may be installed such that the front space of the auxiliary drying unit can be utilized. In some implementations, the operation panel may be disposed at a position in which the overall volume of the drying machine is not greatly increased and user convenience can be improved.

In the example drying machine, the main drying unit is opened and closed from the front side of the drying machine, and the auxiliary drying unit is opened and closed from the top surface of the drying machine so that, even when the drying machine is installed in a limited space, the laundry can be easily put into or taken out from the drying machine.

In some implementations, the user can use the main drying unit and the auxiliary drying unit independently so that a more suitable drying unit for the weight of laundry to be dried among two drying units can be used. The drying units also can be selected according to characteristics of the laundry to be dried.

In some implementations, a cabinet type drying unit can be used for laundry that is not suitable for drum type drying, and when the large-capacity laundry is dried, the drying machine can be divided into the main drying unit and the auxiliary drying unit according to characteristics of the laundry so that drying can be performed.

In some implementations, humid vapor discharged from the auxiliary drying unit may not be discharged toward the user so that the user may not experience an unpleasant feeling during usage.

In some implementations, a rack may be provided in the auxiliary drying unit so that heated air flows in an upward/downward direction of the rack and drying efficiency can be improved.

Furthermore, in some implementations, waste heat generated during an operation of the main drying unit can be supplied to the auxiliary drying unit so that the overall energy efficiency of the drying machine can be improved.

What is claimed is:

1. A dual type drying machine comprising:
a main drying unit;
a main unit door configured to open and close a front side of the main drying unit;
an auxiliary drying unit positioned vertically above the main drying unit and defining a laundry accommodation space;
an auxiliary unit door configured to open and close a top surface of the laundry accommodation space;
a cabinet that accommodates the main drying unit and the auxiliary drying unit, the cabinet defining an exterior of the dual type drying machine; and
an operation panel disposed at a front side of the auxiliary drying unit,
wherein based on the auxiliary unit door being closed, top surfaces of the cabinet and the auxiliary unit door define a top exterior surface of the dual type drying machine,
wherein the auxiliary drying unit further defines an air intake outlet and an exhaust inlet at different positions at a rear surface of the auxiliary drying unit, and
wherein the auxiliary drying unit comprises:
a blower fan that is disposed at an outside of the rear surface of the auxiliary drying unit and that is configured to supply air toward the laundry accommodation space through the air intake outlet, and
a heater disposed at the outside of the rear surface of the auxiliary drying unit and configured to heat air supplied by the blower fan.

2. The dual type drying machine of claim 1, further comprising a rack provided inside the auxiliary drying unit and configured to support laundry.

3. The dual type drying machine of claim 2, wherein the auxiliary drying unit further comprises:
a laundry accommodation unit that includes the laundry accommodation space; and
a temperature sensor configured to measure a temperature of the heated air.

4. The dual type drying machine of claim 3, wherein the auxiliary drying unit includes an air intake flow path configured to guide the supplied air into the laundry accommodation unit through the air intake outlet, and wherein the air intake outlet is positioned vertically below the rack.

5. The dual type drying machine of claim 4, wherein the auxiliary drying unit further comprises an exhaust flow path configured to guide air from an inside of the laundry accommodation unit to an exhaust outlet, the exhaust outlet being configured to discharge air to an outside of the auxiliary drying unit.

6. The dual type drying machine of claim 5, wherein the exhaust flow path is connected to the exhaust inlet, and
wherein the exhaust inlet is spaced apart vertically or laterally from the air intake outlet at the rear surface of the auxiliary drying unit.

7. The dual type drying machine of claim 3, wherein the blower fan and the heater are disposed rearward of the laundry accommodation unit and vertically below the top surface of the cabinet.

8. The dual type drying machine of claim 3, wherein the rack is detachably coupled to the auxiliary drying unit.

9. The dual type drying machine of claim 8, wherein the laundry accommodation unit includes a plurality of props at inner surfaces of the laundry accommodation unit, the plurality of props being configured to support the rack.

10. The dual type drying machine of claim 3, wherein the auxiliary drying unit defines communication holes at a bottom surface of the laundry accommodation space, the communication holes being configured to supply the heated air to the laundry accommodation space.

11. The dual type drying machine of claim 2, wherein the rack is configured to allow heated air in the laundry accommodation space to flow through the rack.

12. The dual type drying machine of claim 11, wherein the rack has a punching plate shape, a screen net shape, or a grille net shape.

13. The dual type drying machine of claim 1, wherein the main drying unit and the auxiliary drying unit are configured to operate independently of each other.

14. The dual type drying machine of claim 1, wherein the auxiliary unit door comprises:
   a first door rotatably coupled to the auxiliary drying unit about a first hinge axis, the first door including a transparent or semi-transparent portion through which an inside of the laundry accommodation space is viewable; and
   a second door rotatably coupled to the first door about a second hinge axis that is positioned forward of the first hinge axis, and
   wherein the auxiliary unit door is configured to be opened by rotating the first door about the first hinge axis or rotating the second door about the second hinge axis or both.

15. The dual type drying machine of claim 14, wherein the first and second hinge axes are parallel to each other, and wherein the auxiliary unit door is configured to be opened by rotating the first door relative to the auxiliary drying unit in a first direction and rotating the second door relative to the first door in a second direction opposite the first direction.

16. The dual type drying machine of claim 14, wherein a length of the first door in a front-to-rear direction is greater than a length of the second door in the front-to-rear direction.

17. The dual type drying machine of claim 14, wherein the auxiliary unit door comprises a sealing unit that is configured, based on the auxiliary unit door being closed, to provide a seal between at least a portion of the auxiliary unit door and the auxiliary drying unit.

18. The dual type drying machine of claim 1, wherein the cabinet comprises:
   a pair of lateral side plates, each of the pair of lateral side plates including a lower lateral side plate that covers a lateral side of the main drying unit and an upper lateral side plate that covers a lateral side of the auxiliary drying unit; and
   a single front panel that covers front portions of the main drying unit and the auxiliary drying unit.

19. The dual type drying machine of claim 18, wherein the cabinet further comprises an intermediate plate positioned between the main drying unit and the auxiliary drying unit, the intermediate plate being parallel with a bottom surface of the cabinet and connecting the pair of lateral side plates to each other.

20. The dual type drying machine of claim 1, wherein a rearmost end of the auxiliary drying unit protrudes rearward relative to a rearmost end of the main drying unit.

* * * * *